Jan. 5, 1937. W. McBAIN 2,066,791
WELDING APPARATUS
Filed March 17, 1936
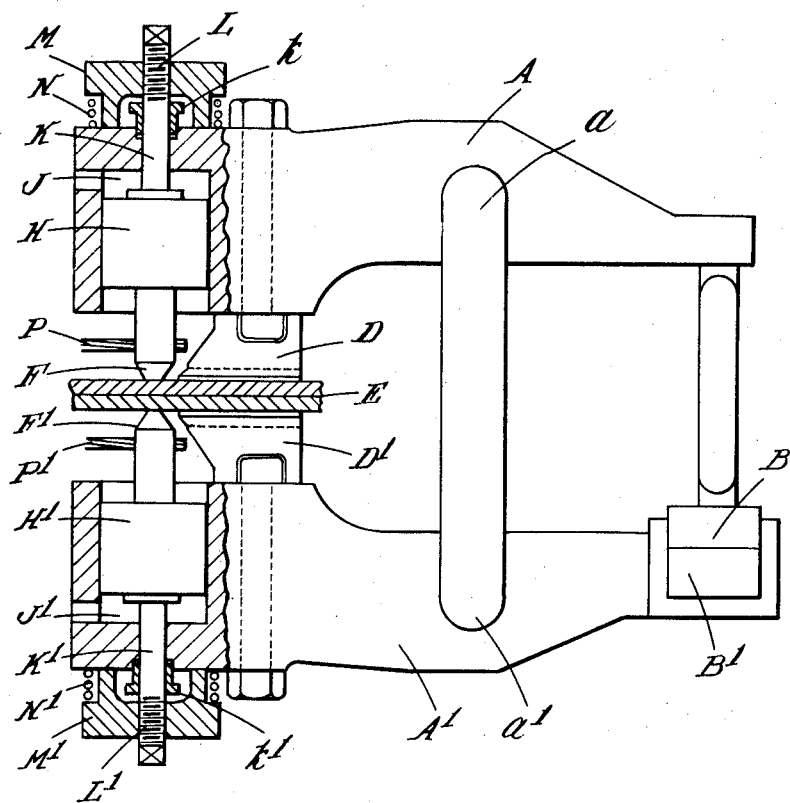
INVENTOR:
WILLIAM McBAIN
BY Haseltine, Lake & Co.
ATTORNEYS Patented Jan. 5, 1937

2,066,791

UNITED STATES PATENT OFFICE 2,066,791

WELDING APPARATUS

William McBain, High Heaton, Newcastle upon Tyne, England, assignor of one-half to Swan, Hunter & Wigham Richardson Limited, Walker, Newcastle upon Tyne, England, a British company Application March 17, 1936, Serial No. 69,268
In Great Britain July 4, 1935

3 Claims. (Cl. 219—4)

This invention relates to the uniting of steel plates or other structures capable of being united by welding. The invention is more particularly although not exclusively intended for uniting iron or steel plates for ship building purposes. The term "plate" will hereinafter be employed for convenience of description, but it is to be understood that this term is intended to refer not only to plates, but also to various shapes of girders and angle irons and other structures whether made of steel or iron or of other metal capable of being united by welding.

The invention relates more particularly to the methods of and apparatus for welding as disclosed in the specification of my British Patent No. 424,627.

It is desideratum that the plates at the welded parts shall have their surfaces in the same plane as they were in before welding both because any indentation will mean that the strength of the weld section will be less than that of the original plate since it has been reduced in thickness, and because any upstanding part even a small ridge indicates a hole or some lack of solidarity in the weld. Indentations and ridges or other projections are also unsightly. Whilst satisfactory results have been obtained in accordance with the invention disclosed in my said prior application some difficulty has been experienced in obtaining uniform results and in avoiding the above mentioned difficulties. The main object of the present invention is to facilitate avoiding these difficulties.

According to the invention the electrodes are pressed against the plates and are prevented from moving further towards each other to any undesirable extent when the material, of the plates becomes plastic between the electrodes. Preferably, the plates are clamped prior to making the metal plastic by clamping jaws on an area outside the weld area and preferably spaced therefrom a sufficient distance to avoid indenting the plates when plastic. Moreover the electrodes are preferably removed after the plates at the weld area have become sufficiently plastic and clamping jaws applied over the weld area which jaws preferably cover the whole of the plastic area and preferably extend also over a sufficient area of the cold plates adjacent to the plastic area to support these clamping jaws against undesirably indenting the plates. If any slight ridge or other deformation is produced this may be pressed back to the normal surface by the pressure applied over the weld area. The clamping jaws may be the same as or different from those used for initially clamping the plates in position. The clamping jaws preferably do not surround or nearly surround the electrodes as this would produce magnetic difficulties resulting in reduced weld area and magnetizing of the welding apparatus. The clamping jaws, electrodes, and other parts, and the pressures applied, and other details, may all be about as described in the specification of our said prior application.

The said means may be arranged so that the electrodes cannot have any further movement towards each other when the work is softened, but it may sometimes happen that the work "shrinks" because of a fibrous structure or because of minute hollows in the work and the electrodes then do not make good electrical contact with the work. To avoid this the electrodes may be brought into contact with the plates and then permitted to move together a very small distance when the weld area becomes plastic whereupon the electrodes are prevented from moving further by mechanical stops. The said small distance may be only a few thousandths of an inch or may be more according to the kind of plates, and is only sufficient to ensure good contact being maintained with the plates as they become plastic and is insufficient to cause undesirable indentation of the plates by the electrodes.

In order that the invention may be clearly understood and readily carried into effect the same will now be described with reference to the accompanying drawing which is a side elevational view of a welding apparatus made in accordance with the invention.

The apparatus comprises two arms A, A¹, pivoted between their ends at $a$, $a^1$, respectively. The rear ends of the arms A, A¹, can be forced apart by an hydraulic ram and cylinder B, B¹, to cause clamping jaws D, D¹, to grip the plates E with a heavy pressure of about four to twelve tons per square inch of the clamping area. The forward ends of the arms A, A¹, to carry the electrodes F, F¹, which can be moved by hydraulic means to contact with the plates and to bear against the plates with comparatively light pressure.

The electrodes F, F¹, are carried by pistons H, H¹, that operate in cylinders J, J¹, in the forward ends of the arms A, A¹. Fluid under pressure can be supplied to the cylinders to press the electrodes against the work. Attached to the said pistons are rods K, K¹, which pass outwardly through the arms A, A¹, and through stuffing boxes $k$, $k^1$, and are threaded as at L, L¹, where they receive nuts M, M¹, which can contact with the outer surfaces of the arms A, A¹, to limit the movement of the electrodes towards each other. Springs N, N¹, between said nuts and said surfaces serve to move the electrodes away from the plates when fluid pressure is released.

In operation when the clamping jaws are clamping the plates together the electrodes are moved by fluid pressure against the plates and the nuts M, M¹, are then adjusted until they are a very small distance from said surfaces. The electric current is then supplied through the conductor leads P, P¹, and when the heated parts of the plates become plastic the electrodes sink into the plates to a very small extent until the nuts M, M¹, contact with said surfaces. The electrodes will thus sink into the plates an exceedingly small amount, insufficient to cause appreciable damage either to the strength or appearance of the plates. This small amount of sinking into the plates by the electrodes is merely sufficient to enable the electrodes to have good electrical contact with the work and may be of the order of only one or two thousandths of an inch.

What I claim and desire to secure by Letters Patent of the United States is:—

1. Apparatus for uniting metal structures comprising a pair of relatively movable arms, electrodes mounted in said arms, means to move the electrodes into contact with the work, outwardly extending rods connected with the electrodes, and adjustable parts carried by said rods and co-operating with said arms to limit the inward movement of the electrodes, said parts being adapted to be adjusted into such positions as to permit the electrodes to move further towards each other by a very small amount when the work becomes plastic, said amount being insufficient to cause harmful indentation of the work but sufficient to ensure good electrical contact with the plates.

2. Apparatus for uniting steel plates or other structures of fusing material for shipbuilding or other purposes and capable of welding together plates of ¼" thickness and upwards and using two electrodes, means to press the electrodes against the plates with less pressure than would harmfully indent the plates during welding, a pair of opposed clamping jaws having an effective area for applying forging pressure upon the plates to be welded, greater than the electrode area applied to said plates, which effective area of the jaws extends over the heated plastic area and upon a sufficient area of cooler area upon the plates to support the applied pressure, there being hydraulic means for forcing the clamping jaws together to grip the work with heavy pressure of at least four tons per square inch on the clamping area, and means to support the electrodes against further movement towards each other when the work becomes plastic.

3. Apparatus for uniting metal structures, comprising a pair of relatively movable arms, electrodes mounted in said arms, outwardly extending rods connected with the electrodes, fluid pressure means capable of operating upon said rods so as to cause the electrodes to be moved together into contact with a work piece, shiftable members secured upon said rods and adjustable thereon to occupy different positions along the lengths thereof, surface members relatively stationary to the rods and adapted to lie within the path of the shiftable members upon said rods to limit the travel of the same, and spring means arranged between said surface members and shiftable members, and constantly urging the rods apart from each other and thereby the electrodes away from the work piece.

WILLIAM McBAIN.